C. A. IGLEHART.
SILO.
APPLICATION FILED JAN. 11, 1918.
1,292,472.
Patented Jan. 28, 1919.
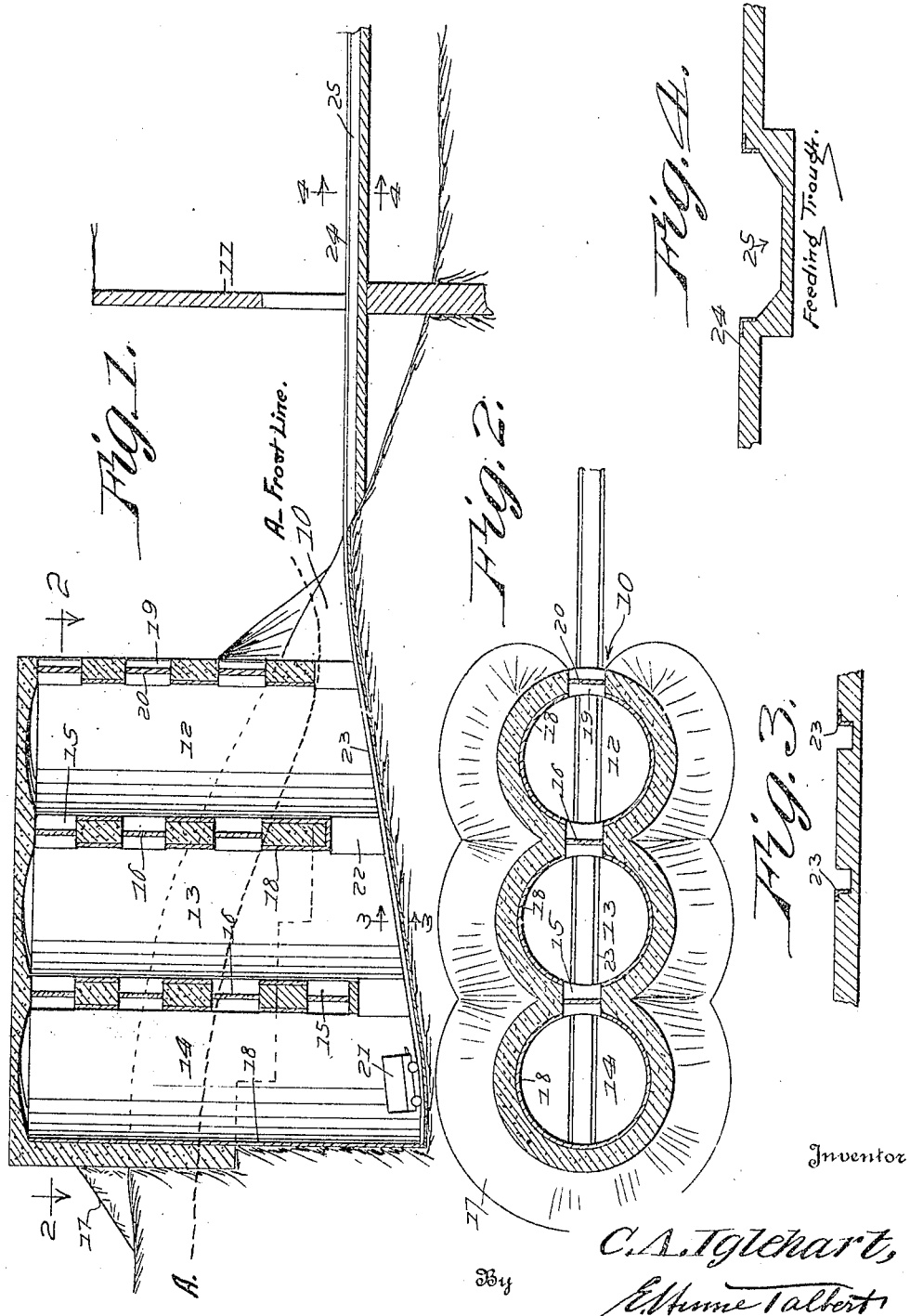

UNITED STATES PATENT OFFICE.

CHARLES A. IGLEHART, OF OAK PARK, ILLINOIS.

SILO.

1,292,472.　　　　　Specification of Letters Patent.　　Patented Jan. 28, 1919.

Application filed January 11, 1918.　Serial No. 211,429.

*To all whom it may concern:*

Be it known that I, CHARLES A. IGLEHART, a citizen of the United States, residing at Oak Park, in the county of Cook and State of Illinois, have invented new and useful Improvements in Silos, of which the following is a specification.

The object of the invention is to provide a silo construction, especially adapted for use in hilly or undulating country and designed to be located in a hillside where it is or may be placed partly or wholly under ground, to constitute what might be termed a subterranean construction, and it has been found that when ensilage is thus stored in a pit, preferably walled, the preservation of the material is entirely satisfactory, while greater protection is afforded by reason of the fact that the silo is not exposed to the elements, to the same extent as it is when the silo is located wholly above the surface of the ground.

Further objects and advantages of the invention will be understood from the following description, it being obvious that changes in form and proportions may be resorted to without departing from the spirit of the invention.

In the drawing:—

Figure 1 is a sectional view of a silo constructed and located in accordance with the invention and disposed in communication with a feeding trough which may be arranged either in the open or in a building, such as a barn or stable, such trough forming a continuing part of the structure of the silo.

Fig. 2 is a horizontal sectional view of the silo proper on the plane indicated by the line 2—2 of Fig. 1.

Fig. 3 is a transverse detail sectional view on the plane indicated by the line 3—3 of Fig. 1 to show the passage-way and track arrangement within the silo building.

Fig. 4 is a detail transverse sectional view on the plane indicated by the line 4—4 of Fig. 1 to show the construction of the trough and the arrangement of the traffic rails located with reference thereto.

In the construction of a silo embodying the invention, a suitable pit should be prepared, preferably in a hillside or rise in the surface of the ground, the entrance of the pit as shown at 10 preferably being substantially in the plane of the surrounding ground or, for example, the bottom or floor of a building 11 such as a barn or stable into which it may be desired to convey the ensilage for access by the stock. Located in this pit is a structure constituting the silo proper, preferably of reinforced concrete and consisting of a plurality of compartments, arranged in a series which are accessible one from the other as indicated at 12, 13 and 14. In practice it has been found desirable to make these compartments of a substantially cylindrical form, not only because of the advantage in strength of structure, and resistance to outside pressure, but because of the fact that ensilage packs more satisfactorily in a chamber of this general form. Each compartment is preferably separated from the next by a wall and these separating walls are provided with openings 15 fitted with suitable doors 16 which may be secured in place by any well known or preferred means which, forming no part of the present invention, are not illustrated in detail in the drawings. Also the exterior walls of the compartment are preferably extended below the surface of the surrounding ground a distance sufficient to cover the frost line A—A as, for example, under ordinary circumstances about four feet, and the extension above the ground will depend upon the proposed dimensions of the compartments particularly as to height, and the slope of the surrounding ground. Also a suitable water shed 17 of earth may be arranged around the walls at the surface of the ground and the inner surfaces of the compartments are preferably provided with a lining 18 of cement or suitable moisture excluding material. The exterior wall of the foremost compartment 12 is correspondingly provided with door openings 19 and removable doors 20 so that as the material is removed beginning at the top of the silo, the doors may be successively opened to enable the operator to work at the surface of the contents.

Extending from the mouth of the pit the floor of the silo preferably inclines downwardly so as to increase the depth and hence the capacity of the intermediate and rearmost compartments, and to facilitate the transportation of the material from the several compartments in succession, a truck 21 may be employed, and for the reception and guidance thereof through the passage-way 22 extending continuously through the series of compartments, suitable tracks 23 may be employed. Also said passage-way with the tracks should be extended beyond the mouth of the pit and the outermost wall of the silo and continue as shown at 24 adjacent to and preferably at either side of a depression 25, which as hereinbefore noted may be either in the open or a suitable barn or stable, to constitute a feeding trough in which the ensilage may be deposited so as to be accessible to the stock.

From the foregoing description it will be noted that this arrangement provides not only, primarily, for the satisfactory preservation of the ensilage, but a storage place of large capacity within a comparatively small space and at a point on the property which otherwise might be of little or no utility, and at the same time the contents of the several compartments are readily accessible, the removal of the same being conducted with reference to the compartments in succession, beginning with the foremost or front compartment. Moreover, as the material is required and is removed, it may readily be conveyed without a second handling to the point of use, by reason of the continuation of the transportation passage to a feeding trough which is accessible to the stock.

What is claimed is:—

A hill-side or subterranean silo consisting of a plurality of compartments having reinforced concrete walls, the lower edges of the walls of the several compartments terminating beneath the frost line, the front wall of the foremost compartment and the adjoining walls of the other compartments having openings therein for establishing access to and communication between the compartments, doors for normally closing the openings, an inwardly extending and rearwardly depressed floor forming a transportation passage common to all of the compartments, and a cementitious moisture excluding lining on the inner surfaces of the walls of the compartments and extending to the floor.

In testimony whereof I affix my signature.

CHARLES A. IGLEHART.

Copies of this patent may be obtained for five cents each, by addressing the "Commissioner of Patents, Washington, D. C."